(12) United States Patent
Kageyama et al.

(10) Patent No.: US 11,697,156 B2
(45) Date of Patent: Jul. 11, 2023

(54) ZIRCONIUM NITRIDE POWDER AND METHOD FOR PRODUCING SAME

(71) Applicant: MITSUBISHI MATERIALS ELECTRONIC CHEMICALS CO., LTD., Akita (JP)

(72) Inventors: Kensuke Kageyama, Akita (JP); Takashi Konishi, Akita (JP); Naoyuki Aiba, Akita (JP)

(73) Assignee: MITSUBISHI MATERIALS ELECTRONIC CHEMICALS CO., LTD., Akita (JP)

( * ) Notice: Subject to any disclaimer, the term of this patent is extended or adjusted under 35 U.S.C. 154(b) by 5 days.

(21) Appl. No.: 17/126,481

(22) Filed: Dec. 18, 2020

(65) Prior Publication Data

US 2022/0193767 A1 Jun. 23, 2022

(51) Int. Cl.
| | |
|---|---|
| *B22F 9/04* | (2006.01) |
| *C09D 163/00* | (2006.01) |
| *C09D 133/08* | (2006.01) |
| *B05D 1/00* | (2006.01) |
| *B05D 3/06* | (2006.01) |
| *B05D 3/02* | (2006.01) |
| *B22F 1/00* | (2022.01) |
| *C08K 3/28* | (2006.01) |
| *B22F 1/052* | (2022.01) |

(52) U.S. Cl.
CPC ............... *B22F 9/04* (2013.01); *B05D 1/005* (2013.01); *B05D 3/0254* (2013.01); *B05D 3/067* (2013.01); *B22F 1/052* (2022.01); *C08K 3/28* (2013.01); *C09D 133/08* (2013.01); *C09D 163/00* (2013.01); *B05D 2502/00* (2013.01); *B05D 2504/00* (2013.01); *B22F 2009/044* (2013.01); *B22F 2009/049* (2013.01); *B22F 2202/01* (2013.01); *B22F 2202/13* (2013.01); *B22F 2302/20* (2013.01)

(58) Field of Classification Search
None
See application file for complete search history.

(56) References Cited

U.S. PATENT DOCUMENTS

| 2019/0225550 A1 | 7/2019 | Laskoski et al. |
| 2020/0198969 A1 | 6/2020 | Kageyama et al. |

FOREIGN PATENT DOCUMENTS

| CN | 102001634 A | | 4/2011 |
|---|---|---|---|
| JP | 2003063156 A | * | 3/2003 |
| JP | 2009-91205 A | | 4/2009 |
| JP | 2015-117302 A | | 6/2015 |
| JP | 2017-222559 A | | 12/2017 |
| JP | 2019-104651 A | | 6/2019 |
| JP | 2020-019691 A | | 2/2020 |
| JP | 2020-158377 A | | 10/2020 |
| JP | 2020-180036 A | | 11/2020 |
| WO | WO 2019/013343 A1 | | 1/2019 |

OTHER PUBLICATIONS

Machine translation JP2020158377 (Year: 2020).*
Machine translation JP2003-063156 (Year: 2003).*
ESR for EP App. No. 20215788.9, dated May 18, 2021.
Zhao et al., "Synthesis and Characterization of Zirconium Nitride Nanopowders by Internal Gelation and Carbothermic Nitradation", Scientific Reports, vol. 1 (1999).
Chau et al., "Microwave plasma synthesis of TIN and ZrN nanopowders", Materials Letters, 61:1583-1587 (2007).
Office Action for JP App. No. 2019-160829, dated May 9, 2023 (w/ translation).

* cited by examiner

*Primary Examiner* — Alexandre F Ferre
(74) *Attorney, Agent, or Firm* — Greenblum & Bernstein, P.L.C.

(57) ABSTRACT

A zirconium nitride powder having a volume resistivity of 107 Ω·cm or more in the state of the pressurized powder body hardened at a pressure of 5 MPa, and a particle size distribution D90 of 10 μm or less when ultrasonically dispersed for 5 minutes in a state of being diluted with water or an alcohol having a carbon number of which is in a range of 2 to 5. Also, the zirconium nitride powder is dispersed in an acrylic monomer or an epoxy monomer to prepare a monomer dispersion. Further, the zirconium nitride powder is dispersed in a dispersing medium as a black pigment and further a resin is mixed to prepare a black composition.

12 Claims, No Drawings

ZIRCONIUM NITRIDE POWDER AND METHOD FOR PRODUCING SAME

TECHNICAL FIELD

The present invention relates to a zirconium nitride powder which is suitably used as a black pigment having high ultraviolet transmittance and high blackness, and further high insulating property and a method for producing the same.

BACKGROUND ART

Heretofore, there is disclosed a zirconium nitride powder having a specific surface area measured by the BET method of 20 $m^2$/g to 90 $m^2$/g, and in the X-ray diffraction profile, having a peak of zirconium nitride but having neither a peak of zirconium dioxide nor a peak of lower zirconium oxide (for example, see Patent Document 1 (Claim 1, paragraph [0016])). This zirconium nitride powder has, in the dispersion liquid transmission spectrum with a powder concentration of 50 ppm, a light transmittance X of at least 18% at 370 nm, a light transmittance Y of 12% or less at 550 nm, and (X/Y) of 2.5 or more which is the light transmittance Y at 550 nm to the light transmittance X at 370 nm.

The zirconium nitride powder configured in such a manner has a specific surface area of 20 $m^2$/g or more, so that it has an effect of suppressing sedimentation when it is used as a resist, and it is 90 $m^2$/g or less, so that it has an effect of having a sufficient light-shielding property. Also, in the X-ray diffraction profile, it has a peak of zirconium nitride but it does not have a peak of zirconium dioxide, a peak of lower zirconium oxide and a peak of lower zirconium oxynitride, so that it has a characteristic that, in the dispersion liquid transmission spectrum at a powder concentration of 50 ppm, a light transmittance X at 370 nm is at least 18% and a light transmittance Y at 550 nm is 12% or less, and also has a characteristic that X/Y is 2.5 or more. By having X/Y being 2.5 or more, there is a characteristic that ultraviolet rays are further transmitted. As a result, when a black patterning film is formed using it as the black pigment, a patterning film having high-resolution can be formed, and the formed patterning film becomes to have a high light-shielding property.

PRIOR ART DOCUMENT

Patent Document

Patent Document 1: JP 2017-222559A

SUMMARY OF THE INVENTION

Problems to be Solved by the Invention

In the zirconium nitride powder shown in the above-mentioned Patent Document 1, when the zirconium nitride crude powder is dispersed in a dispersing medium and dispersibility is enhanced by using a bead mill (media: zirconia) or the like, a high insulating property can be obtained, but when the zirconium nitride powder is directly kneaded into a resin paste having high viscosity, the zirconium nitride crude powder remains and dispersibility is insufficient. Therefore, when the zirconium nitride powder is used as a black pigment, there are defects that coloring power of the black paint is lowered and a resistance value is lowered due to residual of the zirconium nitride crude powder. Also, when the above-mentioned zirconium nitride crude powder is compulsorily pulverized by a dry pulverizer or the like, the powder diameter becomes small and oxidation reaction occurs on the surface of the powder so that, while insulating property is improved, there is a problem that blackness of the black paint is lowered.

A first object of the present invention is to provide a zirconium nitride powder which can obtain high blackness and high insulating property, and a method for producing the same. A second object of the present invention is to provide a method for producing a zirconium nitride powder capable of maintaining high blackness by low temperature wet media pulverization or by pulverization with a jet mill emitting a small calorific value. A third object of the present invention is to provide a method for producing a zirconium nitride powder which can improve insulating property of a black film by firing in an inert gas atmosphere.

Means to Solve the Problems

A first aspect of the present invention is a zirconium nitride powder having a volume resistivity of $10^7$ Ω·cm or more in a state of a pressurized powder body hardened at a pressure of 5 MPa, and a particle size distribution $D_{90}$ of 10 μm or less when ultrasonically dispersed for 5 minutes in a state of being diluted with water or an alcohol having a carbon number in a range of 2 to 5.

A second aspect of the present invention is a method for producing a zirconium nitride powder comprising: a step of generating a zirconium nitride crude powder by a thermite process or a plasma synthetic method; a step of fabricating a zirconium nitride precursor powder having a particle size distribution $D_{90}$ of 10 μm or less when ultrasonically dispersed for 5 minutes in a state of being diluted with water or an alcohol having a carbon number in a range of 2 to 5 by subjecting the zirconium nitride crude powder to low temperature wet media pulverization at a temperature of a dispersing medium of 10° C. or lower or subjecting to jet mill pulverization at a gas pressure of 0.3 MPa or higher; and a step of producing a zirconium nitride powder having a volume resistivity of $10^7$ Ω·cm or more in the state of the pressurized powder body hardened at a pressure of 5 MPa by firing the pulverized zirconium nitride precursor powder in an inert gas atmosphere.

A third aspect of the present invention is a monomer dispersion wherein the zirconium nitride powder described in the first aspect is dispersed in an acrylic monomer or an epoxy monomer.

A fourth aspect of the present invention is a black composition wherein the zirconium nitride powder described in the first aspect is dispersed in a dispersing medium as a black pigment and further a resin being mixed.

A fifth aspect of the present invention is a method for fabricating a black film comprising: a step of forming a coating film by coating the monomer dispersion described in the third aspect onto a substrate; and a step of fabricating a black film by subjecting the coated film to heat curing or ultraviolet curing.

A sixth aspect of the present invention is a method for producing a black film comprising: a step of forming a coating film by coating the black composition described in the fourth aspect onto a substrate; and a step of fabricating a black film by subjecting the coated film to heat curing or ultraviolet curing.

Effects of the Invention

The zirconium nitride powder of the first aspect of the present invention has a volume resistivity of $10^7$ Ω·cm or more in the state of the pressurized powder body hardened at a pressure of 5 MPa, so that insulation property can be improved when a black thick film having a thickness of about 10 µm to 100 µm is produced. Also, the zirconium nitride powder has a particle size distribution $D_{90}$ of 10 µm or less when ultrasonically dispersed for 5 minutes in a state of being diluted with water or an alcohol having a carbon number in a range of 2 to 5, so that the zirconium nitride crude powder does not exist, and good dispersion or dispersed liquid can be obtained. As a result, the black film fabricated by the dispersion or dispersed liquid using the above-mentioned zirconium nitride powder can give high light-shielding property, i.e., high blackness, and high insulating property.

In the method for producing the zirconium nitride powder of the second aspect of the present invention, when the zirconium nitride crude powder is subjected to low temperature wet media pulverization at a temperature of a dispersing medium of 10° C. or lower, and a calorific value is small, so that oxidation of the surface of the zirconium nitride does not proceed whereby high blackness can be maintained. Also, when the zirconium nitride crude powder is subjected to jet mill pulverization with a gas pressure of 0.3 MPa or higher, the zirconium nitride crude powder does not remain and insulating property of the black film can be improved. Further, by firing the above-mentioned pulverized zirconium nitride precursor powder in an inert gas atmosphere, insulating property of the black film can be improved.

In the monomer dispersion of the third aspect of the present invention, the zirconium nitride powder of the first aspect of the present invention is dispersed in an acrylic monomer or an epoxy monomer, even if viscosities of these monomers are relatively high, dispersibility of the zirconium nitride powder to the above-mentioned monomer can be maintained well. As a result, the black film using the monomer dispersion can obtain high light-shielding property, i.e., high blackness, and high insulating property.

In the black composition of the fourth aspect of the present invention, the zirconium nitride powder of the first aspect of the present invention is dispersed in a dispersing medium as a black pigment and further a resin is mixed, so that the zirconium nitride powder is uniformly dispersed in the dispersing medium. As a result, the black film using the black composition can obtain high light-shielding property, i.e., high blackness, and high insulating property.

In the method for fabricating the black film of the fifth aspect of the present invention, the above-mentioned monomer dispersion is coated on a substrate to form a coating film, and then, the coated film is subjected to heat curing or ultraviolet curing to fabricate a black film, so that the black film can obtain high light-shielding property, i.e., high blackness, and high insulating property.

In the method for fabricating the black film of the sixth aspect of the present invention, the above-mentioned black composition is coated on a substrate to form a coating film, and then, the coated film is subjected to heat curing or ultraviolet curing to fabricate a black film, so that the black film can obtain high light-shielding property, i.e., high blackness, and high insulating property.

EMBODIMENTS TO CARRY OUT THE INVENTION

Next, an embodiment to carry out the present invention will be explained. In the zirconium nitride powder of the present embodiment, a volume resistivity in the state of the pressurized powder body hardened at a pressure of 5 MPa is $10^7$ Ω·cm or more, and preferably $10^8$ Ω·cm or more, and a particle size distribution $D_{90}$ when ultrasonically dispersed for 5 minutes in a state of being diluted with water or an alcohol having a carbon number in a range of 2 to 5 is 10 µm or less, and preferably 8 µm or less. Here, the reason why the above-mentioned volume resistivity is limited to $10^7$ Ω·cm or more is that if it is less than $10^7$ Ω·cm, the insulating property at the time of fabricating a black film having a thickness of about 1 µm to 100 µm using the zirconium nitride powder is lowered. Also, the reason why the above-mentioned particle size distribution $D_{90}$ is limited to 10 µm or less is that if it exceeds 10 µm, the zirconium nitride crude powder remains and good dispersion or black film cannot be obtained.

The above-mentioned volume resistivity is measured by, for example, a four-terminal four-probe method using a low resistivity meter Loresta-GP (Model: UV-3101PC) manufactured by Mitsubishi Chemical Corporation. This four-terminal four-probe method is a method in which four needle-shaped electrodes are placed on the surface of a sample (compact powder) in a straight line at predetermined intervals, a constant current is applied between the two outer needle-shaped electrodes, and the potential difference generated between the two inner needle-shaped electrodes is measured to obtain the volume resistivity.

Also, the zirconium nitride powder is in a state of secondary particles in which primary particles are aggregated, and the particle size distribution of the secondary particle of the powder is a volume-based particle size distribution measured by a laser diffraction scattering method. Here, measurement of the volume-based particle size distribution by the laser diffraction scattering method is carried out as follows. First, 0.1 g of the zirconium nitride powder (secondary particles) is put into 20 g of ion exchanged water, and ultrasonic wave with 25 kHz is irradiated for 5 minutes to disperse the zirconium nitride powder in the ion exchanged water. Next, the obtained dispersed liquid of the zirconium nitride powder was added dropwise to an observation cell of a laser diffraction scattering type particle size distribution measurement device (trade name: LA-300 manufactured by HORIBA, Ltd.) with an appropriate amount, and according to the procedure of this device, the particle size distribution is measured. The particle size distribution measured by this laser diffraction scattering method is the particle size distribution of the secondary particles in which the primary particles of the zirconium nitride powder are aggregated. Incidentally, in place of the ion exchanged water, an alcohol having a carbon number in the range of 2 to 5 may be used. Example of the alcohol having 2 carbon atoms, ethanol is mentioned, examples of the alcohol having 3 carbon atoms, 1-propanol, 2-propanol and the like are mentioned, examples of the alcohol having 4 carbon atoms, 1-butanol, 2-butanol and the like are mentioned, and examples of the alcohol having 5 carbon atoms, 1-pentanol, 2-pentanol and the like are mentioned. Incidentally, there is a defect that volatility is high and the measured value is not stable if the number of the carbon atom is 1 or less, while there is a defect that affinity is insufficient and the measured value is not stable if the number of the carbon atom is 6 or more.

A method for producing the zirconium nitride powder thus constituted will be explained. First, a zirconium nitride crude powder is generated by a thermite process or a plasma synthetic method. In the present specification, the thermite process refers to a method in which the zirconium oxide powder is reacted with a $N_2$ gas (nitrogen gas) in the presence of metallic magnesium to reduce the powder. In this embodiment, as the zirconium oxide powder, zirconium dioxide ($ZrO_2$) powder or zirconium dioxide ($ZrO_2$) powder onto which silica has been coated is used. Also, the magnesium nitride ($Mg_3N_2$) powder is added to the metallic magnesium powder. Using these powders as starting materials, these are fired under a specific atmosphere at a specific temperature and time, a zirconium nitride crude powder having a specific surface area of 20 $m^2/g$ to 90 $m^2/g$ measured by the BET method is generated.

[Zirconium Dioxide Powder]

As the zirconium dioxide powder, for example any of the powders of the zirconium dioxide such as monoclinic zirconium dioxide, cubic zirconium dioxide, yttrium stabilized zirconium dioxide or the like can be used, and from the viewpoint of increasing the generation rate of the zirconium nitride powder, monoclinic zirconium dioxide powder is preferred. Also, each of an average primary particle size of the zirconium dioxide powder or the zirconium dioxide powder onto which silica has been coated, and an average primary particle size of the magnesium oxide powder are preferably 500 nm or less of an average primary particle size converted into a sphere from the measured value of the specific surface area to obtain a zirconium nitride crude powder having the specific surface area of 20 $m^2/g$ to 90 $m^2/g$ measured by the BET method, and preferably 500 nm or less and 10 nm or more of an average primary particle size powder from easiness in handling of the powder.

[Zirconium Dioxide Powder onto which Silica has been Coated]

The zirconium dioxide powder onto which silica has been coated can be obtained by mixing a zirconium dioxide powder and a silicate sol-gel liquid to prepare a slurry, and the slurry is dried and pulverized. A mixing ratio of the zirconium dioxide and the silicate sol-gel liquid is preferably (90.0 to 99.5):(10.0 to 0.5) of zirconium dioxide:silica content of silicate sol-gel liquid in terms of a mass ratio. If the silica content is less than the lower limit value, silica coating ratio of the zirconium dioxide surface is too low, while if the silica content exceeds the upper limit value, there is a defect that the light-shielding property is insufficient when a patterning film is formed by using the obtained zirconium nitride powder.

It is preferable that the zirconium dioxide powder is charged in a dispersing medium such as water, an alcohol and the like and mixed, then the mixed liquid is added to the silicate sol-gel liquid and mixed, since the zirconium dioxide is uniformly mixed with the sol-gel liquid. The silicate sol-gel liquid is preferably a liquid in which a silicate such as methyl silicate, ethyl silicate or the like is dissolved in a solvent such as water, an alcohol or the like. A mixing ratio of the zirconium dioxide and the sol-gel liquid is so determined that the solid content concentration of the obtained slurry is 10% by mass to 50% by mass in terms of the solid content. The obtained slurry is dried in the air or in a vacuum atmosphere at a temperature of 60° C. to 350° C. for 1 minute to 360 minutes to obtain a zirconium dioxide powder onto which silica has been coated.

By using the zirconium dioxide powder onto which silica has been coated as the raw material, it is possible to suppress grain growth at the time of firing, a finer zirconium nitride powder having the specific surface area of 20 $m^2/g$ to 90 $m^2/g$ measured by the BET method can be obtained. At this time, the zirconium nitride powder contains silicon oxide and/or silicon nitride in a ratio of 10.0% by mass or less, and preferably 9.0% by mass or less. If it exceeds 10.0% by mass, there is a defect that the light-shielding property is insufficient when a patterning film is formed by using the obtained zirconium nitride powder.

[Metallic Magnesium Powder]

If the metallic magnesium powder has too small particle size, the reaction will proceed abruptly and risk of operation will increase so that a material having a particle size of 100 μm to 1,000 μm in a grain state with a mesh path of a sieve is preferable, and in particular, 200 μm to 500 μm in a grain state is preferable. However, even if all the metallic magnesium is not within the above-mentioned particle size range, it is sufficient if 80% by mass or more thereof, in particular, if 90% by mass or more is within the above-mentioned range.

The amount of metallic magnesium powder added to the zirconium dioxide powder affects the reducing power of the zirconium dioxide as well as the amount of an ammonia gas and a hydrogen gas in the atmospheric gas mentioned later. If the amount of the metallic magnesium is too little, the objective zirconium nitride powder will be difficultly obtained due to insufficient reduction, while if it is too much, the reaction temperature will abruptly rise due to excess metallic magnesium, and there is a fear of causing grain growth of the powder and it becomes uneconomical. The metallic magnesium powder is mixed by adding the metallic magnesium powder to the zirconium dioxide powder so that the metallic magnesium has a ratio of 2.0-fold mol to 6.0-fold mol to that of the zirconium dioxide depending on the size of the particle size. If it is less than 2.0-fold mol, the reduction reaction of the zirconium dioxide is insufficient, while if it exceeds 6.0-fold mol, the reaction temperature will abruptly rise due to excess metallic magnesium, and there is a fear of causing grain growth of the powder and it becomes uneconomical.

[Magnesium Nitride Powder]

The magnesium nitride powder coats the surface of the zirconium nitride at the time of firing to alleviate the reducing power of the metallic magnesium to prevent from sintering and grain growth of the zirconium nitride powder. The magnesium nitride powder is mixed by adding to the zirconium dioxide so that the magnesium nitride has a ratio of 0.3-fold mol to 3.0-fold mol to that of the zirconium dioxide depending on the size of the particle size. If it is less than 0.3-fold mol, the zirconium nitride powder cannot be prevented from sintering, while if it exceeds 3.0-fold mol, there is a defect that an amount of the acidic solution required for acid cleaning after firing increases. It is preferably 0.4-fold mol to 2.0-fold mol. The magnesium nitride powder preferably has an average primary particle size converted into a sphere from the measured value of the specific surface area the specific surface area of 1,000 nm or less, and preferably 10 nm or more to 500 nm or less of the average primary particle size powder from easiness in handling of the powder. Incidentally, not only the magnesium nitride, but also the magnesium oxide is effective to prevent from sintering of the zirconium nitride, so that it is possible to use magnesium nitride by mixing with the magnesium oxide in a part thereof.

[Reduction Reaction with Metallic Magnesium Powder]

A temperature at the time of the reduction reaction by the metallic magnesium for generating the zirconium nitride crude powder is 650° C. to 900° C., and preferably 700° C. to 800° C. 650° C. is a melting temperature of the metallic magnesium, and if the temperature is lower than that, the reduction reaction of the zirconium dioxide does not occur sufficiently. Also, even if the temperature is made higher than 900° C., the effect does not increase, heat energy is wasted and sintering of the powder proceeds, which are not preferable. Also, the time of the reduction reaction is preferably 30 minutes to 90 minutes, and more preferably 30 minutes to 60 minutes.

A reaction apparatus at the time of carrying out the above-mentioned reduction reaction is preferably one having a lid so that the raw materials or the products do not scatter at the time of the reaction. This is because when melting of the metallic magnesium is started, the reduction reaction proceeds abruptly, and accompanied thereby, the temperature rises and the gas inside the vessel expands, whereby there is a fear that the material inside the vessel scatter to the outside.

[Atmospheric Gas at the Time of Reduction Reaction with Metallic Magnesium Powder]

The atmospheric gas is a nitrogen gas alone, or a mixed gas of a nitrogen gas and a hydrogen gas, or a mixed gas of a nitrogen gas and an ammonia gas. The above-mentioned reduction reaction is carried out in the stream of the above-mentioned mixed gas. The nitrogen gas in the mixed gas has a role of preventing contact between the metallic magnesium or a reduction product and oxygen whereby preventing oxidation of these materials, and reacting nitrogen with zirconium to generate zirconium nitride. The hydrogen gas or the ammonia gas in the mixed gas has a role of reducing zirconium dioxide together with metallic magnesium. The hydrogen gas is preferably contained in the above-mentioned mixed gas in an amount of 0% by volume to 40% by volume, and further preferably 10% by volume to 30% by volume. Also, the ammonia gas is preferably contained in the above-mentioned mixed gas in an amount of 0% by volume to 50% by volume, and further preferably 0% by volume to 40% by volume. By using the atmospheric gas having the reducing power, a zirconium nitride powder containing neither lower zirconium oxide and lower zirconium oxynitride can be finally produced. On the other hand, if the ratio of the hydrogen gas or the ratio of the ammonia gas is higher than this range, the reduction proceeds but the nitrogen source is reduced, and lower zirconium oxide or lower zirconium oxynitride is generated, which is not desirable. Also, the reason why the ratio of the ammonia gas is higher than the ratio of the hydrogen gas is so considered that nitriding capacity of the gas is higher in ammonia than that in hydrogen.

On the other hand, the method of generating the zirconium nitride crude powder by the plasma synthetic method is a method in which metallic zirconium powder is introduced into a plasma nanoparticle manufacturing apparatus to obtain zirconium nitride nanoparticles in an $N_2$ gas atmosphere. The zirconium nitride synthesized by the method can obtain a material in which the specific surface area measured by the BET method is 20 $m^2/g$ to 90 $m^2/g$, but there are demerits that combustibility of the metallic zirconium which is a raw material is high and thus dangerous, and the cost becomes high. Incidentally, the nanoparticles generated by the plasma synthetic method may be coarsened due to abrupt surface oxidation, adhesion, aggregation, etc., to become a crude powder in some cases in the cooling process or product take out process, so that the material generated by the plasma synthetic method was also made as a zirconium nitride crude powder.

Next, this zirconium nitride crude powder is subjected to low temperature wet media pulverization at a temperature of a dispersing medium of 10° C. or lower or to jet mill pulverization with a gas pressure of 0.3 MPa or higher to fabricate a zirconium nitride precursor powder having a particle size distribution $D_{90}$ of 10 μm or less when ultrasonically dispersed for 5 minutes in a state of being diluted with water or an alcohol having a carbon number in a range of 2 to 5. Incidentally, the specific surface area of the zirconium nitride precursor powder measured by the BET method is 22 $m^2/g$ to 120 $m^2/g$.

The above-mentioned low temperature wet media pulverization method refers to a bead mill pulverization method in which the zirconium nitride crude powder is dispersed in a dispersing medium such as ion exchanged water or an alcohol having 2 to 5 carbon atoms and the like, and in a state where the temperature of the dispersing medium is maintained to 10° C. or lower, a media such as zirconia, alumina, glass, urethane resin, and the like having an average particle size of 50 μm to 500 lam is used. Here, the reason why the temperature of the dispersing medium is maintained to 10° C. or lower is that if it exceeds 10° C., pulverization of the zirconium nitride precursor powder excessively proceeds and the OD value of the black film mentioned later is lowered. Incidentally, in order to maintain the temperature of the dispersing medium to 10° C. or lower, liquid nitrogen may be used as a dispersing medium or dry ice beads may be used as media. Also, when the zirconium nitride crude powder is pulverized by the above-mentioned low temperature wet media pulverization method, a calorific value is small, so that surface oxidation of the zirconium nitride does not proceed, and high blackness can be maintained.

Also, the jet mill pulverization with a gas pressure of 0.3 MPa or higher refers to a process in which a high-pressure air of 0.3 MPa or higher injected from a nozzle, an inert gas such as nitrogen or the like, or vapor is made to collide with powder as an ultra-high-speed jet, and to pulverize powders to fine powders with a level of several μm by collision of the powders with each other, and the injected air or vapor reaches around the speed of sound. As a feature of the jet mill, there may be mentioned that pulverization at a low temperature is possible since the injected gas adiabatically expands to lower the temperature, so that pulverization at a low temperature is possible, and even in a reducing substance such as zirconium nitride in the present invention, it is possible to suppress oxidation. Here, the reason why the above-mentioned gas pressure is limited to 0.3 MPa or higher is that if it is less than 0.3 MPa, zirconium nitride crude powder remains. Incidentally, when the zirconium nitride crude powder is pulverized by the above-mentioned jet mill pulverization method, the zirconium nitride crude powder does not remain and insulating property of the black film can be improved.

Further, by firing the pulverized zirconium nitride precursor powder in an inert gas atmosphere, a zirconium nitride powder having a volume resistivity of $10^7$ Ω·cm or more in the state of the pressurized powder body hardened at a pressure of 5 MPa is produced. As the inert gas, there may be mentioned an $N_2$ gas, a helium gas, an argon gas and the like. The above-mentioned firing temperature is preferably within the range of 250° C. to 550° C., and the firing time is preferably within the range of 1 hour to 5 hours. Here, the reason why the preferred firing temperature is limited in the range of 250° C. to 550° C. is that if it is less than 250° C., increase in the resistance value is insufficient, while if it exceeds 550° C., fusion of the powders to each other proceeds to increase crude powders. Also, the reason why the preferred firing time is limited within the range of 1 hour to 5 hours is that if it is shorter than 1 hour, increase in the resistance value is insufficient, while if it exceeds 5 hours, the effect does not change and it becomes uneconomical. Incidentally, by firing the zirconium nitride precursor powder in an inert gas atmosphere, insulating property of the black film can be improved. The detailed mechanism by which the insulating property of the black film is improved by firing in an inert gas atmosphere is unknown, but it can be presumed that it is caused by the facts that the crude powder of zirconium nitride is disappeared and uniformity of the powder becomes good, the contact points are reduced, and an extremely thin insulating layer is formed on the surface of the black film.

The above-mentioned zirconium nitride powder is dispersed in an acrylic monomer or an epoxy monomer to prepare a monomer dispersion. This monomer dispersion is useful for applications such as a resin composition, resin molded product and the like, which contains inorganic powder being dispersed. Also, the above-mentioned monomer dispersion may further contain a metal oxide powder, and can further contain a plasticizer. The plasticizer is not particularly limited and may be mentioned, for example, conventionally known plasticizers including a phosphate ester-based plasticizer such as tributyl phosphate, 2-ethylhexyl phosphate and the like, a phthalate ester-based plasticizer such as dimethyl phthalate, dibutyl phthalate and the like, aliphatic-basic ester-based plasticizers such as butyl oleate, glycerin monooleate and the like, aliphatic dibasic acid ester-based plasticizers such as dibutyl adipate, di-2-ethylhexyl sebacate and the like; divalent alcohol ester-based plasticizers such as diethylene glycol dibenzoate, triethylene glycol di-2-ethylbutyrate and the like; oxyacid ester-based plasticizers such as methyl acetyl ricinolate, acetyl tributyl citrate and the like. Further, another monomer can be further added to the monomer dispersion. Another monomer is not particularly limited and may be mentioned, for example, conventionally known monomers including (meth)acrylic-based monomers such as (meth)acrylic acid, (meth)acrylate and the like, styrene-based monomers such as styrene, vinyl toluene, divinyl benzene and the like, vinyl-based monomers such as vinyl chloride, vinyl acetate and the like, urethane-based monomers such as urethane acrylate and the like, the above-mentioned various kinds of polyols and the like. Incidentally, a viscosity of the monomer dispersion is preferably set within the range of 10 Pa·s to 1,000 mPa·s in consideration of dispersibility of the zirconium nitride powder. With regard to dispersion in the monomer, similar to dispersion in a solvent, it is possible to employ a mill system using a pulverization medium. Also, although it is not an essential component, it is also possible to use a polymer dispersant in order to further improve dispersibility. It is effective that the polymer dispersant has a molecular weight of several thousand to tens of thousands, and as the functional group adsorbed on a pigment, there may be mentioned secondary amine, tertiary amine, carboxylic acid, phosphoric acid, phosphoric acid ester and the like, and in particular, tertiary amine and carboxylic acid are effective. It is also effective to add a small amount of a silane coupling agent instead of the polymer dispersant in improving dispersibility. On the other hand, it is also possible to obtain a monomer dispersion after planetary stirring is carried out, by passing through three rolls several times. On the other hand, a black composition in which the zirconium nitride powder is dispersed in a dispersing medium as a black pigment and further a resin is mixed is prepared. As the above-mentioned dispersing medium, there may be mentioned propylene glycol monomethyl ether acetate (PGMEA), methyl ethyl ketone (MEK), butyl acetate (BA) and the like. Also, as the above-mentioned resin, there may be mentioned an acrylic resin, an epoxy resin and the like. As for the solvent-based dispersion, it is effective to add a polymer dispersant as in the monomer dispersion, it is also effective that the molecular weight is several thousand to tens of thousands as in the monomer dispersion, and as a functional group, a tertiary amine and carboxylic acid are effective.

Next, a method for fabricating a black film using the above-mentioned monomer dispersion will be explained. First, after a photopolymerization initiator is added to the monomer dispersion, this monomer dispersion is coated onto a substrate to form a coating film. Next, this coating film is subjected to heat curing or ultraviolet curing to fabricate a black film. As the above-mentioned substrate, there may be mentioned, for example, glass, silicon, polycarbonate, polyester, aromatic polyamide, polyamideimide, polyimide and the like. Also, to the above-mentioned substrate, if desired, appropriate pretreatment such as chemical treatment by a silane coupling agent and the like, plasma treatment, ion plating, sputtering, gas phase reaction method, vacuum deposition and the like may be subjected. When the monomer dispersion is coated onto the substrate, spin coating, flow cast coating, roll coating and the like can be employed.

In order to heat curing the above-mentioned coating film, it is preferable to retain it in the air at a temperature of 80° C. to 250° C. for 5 minutes to 60 minutes. Here, the reason why the heat curing temperature of the coating film is limited within the range of 80° C. to 250° C. is that if it is lower than 80° C., the coating film does not cure sufficiently, while if it exceeds 250° C., the substrate softens. Also, the reason why the heat curing time of the coating film is limited within the range of 5 minutes to 60 minutes is that if it is shorter than 5 minutes, the coating film does not cure sufficiently, while if it is longer than 60 minutes, it takes more time than necessary and it is uneconomical. On the other hand, in order to cure the above-mentioned coating film with ultraviolet rays, to the monomer dispersion is previously added a photopolymerization initiator cleaved by ultraviolet rays, such as Irgacure 184 (manufactured by BASF), Irgacure 250 (manufactured BASF), Irgacure 270 (manufactured by BASF), Irgacure 369 (manufactured by BASF), Irgacure 500 (manufactured by BASF), Irgacure 907 (manufactured by BASF), ADEKA optomer N-1919 (manufactured by ADEKA Corp.) and the like. Then, after the monomer dispersion to which the photopolymerization initiator is added is coated onto the substrate, prebaking is carried out to evaporate the solvent to form a photoresist film. Next, after exposing the photoresist film to a predetermined pattern shape through a photomask, the photoresist film was developed by using an alkaline developer to dissolve and remove the unexposed portion thereof, and then post-baking is preferably carried out to form a predetermined black film.

A film thickness of the black film after curing is preferably within the range of 0.1 μm to 100 μm. In particular, it is suitable for fabricating a thick black film having a film thickness of 10 μm to 100 μm. Also, the OD value (Optical Density value) of the black film is an optical density as an index showing light-shielding property (attenuation of transmittance) of the black film using the zirconium nitride powder. Specifically, the OD value is a value represented by logarithm of the degree to which light is absorbed when passing through the black film, and is defined by the following equation (1). In the equation (1), I is a transmitted light quantity, and I° is an incident light quantity.

$$\text{OD value} = -\log_{10}(I/I_0) \quad (1)$$

Further, the OD value of the above-mentioned black film is preferably 2.0 or more to secure high light-shielding property, and the volume resistivity of the black film is preferably $1 \times 10^{13}$ Ω·cm or more to secure high insulating property.

A method for fabricating a black film using the above-mentioned black composition will be explained. First, the black composition is coated onto the substrate to form a coating film. Next, this coating film is subjected to heat curing or ultraviolet curing to fabricate a black film. The method for fabricating the black film using the black composition is substantially the same as the method for fabricating the black film using the above-mentioned monomer dispersion so that repeated explanation will be omitted.

EXAMPLES

Next, Examples of the present invention will be explained in detail together with Comparative Examples.

Example 1

First, a zirconium nitride crude powder was prepared by the thermite process. Specifically, to 7.4 g of a monoclinic zirconium dioxide powder having an average primary particle size of 50 nm calculated from the specific surface area measured by the BET method were added 7.3 g of a metallic magnesium powder having an average primary particle size of 150 μm and 3.0 g of a magnesium nitride powder having an average primary particle size of 200 nm, and the mixture was uniformly mixed by a reaction apparatus in which a graphite boat was inner packaged in a glass tube made of quartz. At this time, the added amount of the metallic magnesium was 5.0-fold mol of that of the zirconium dioxide, and the added amount of the magnesium nitride was 0.5-fold mol of that of the zirconium dioxide. This mixture was fired at a temperature of 700° C. for 60 minutes under an atmosphere of a nitrogen gas to obtain a fired product. This fired product was dispersed in 1 liter of water, 10% hydrochloric acid was gradually added to wash the mixture at a pH of 1 or more while maintaining the temperature to 100° C. or lower, and then, the mixture was adjusted to pH 7 to pH 8 with 25% aqueous ammonia and filtered. The filtered solid content was dispersed again in water with 400 g/liter, and once again, in the same manner as mentioned above, the mixture was subjected to acid washing and pH adjustment with aqueous ammonia, and then filtered. After acid washing and pH adjustment with aqueous ammonia were repeated twice in such a manner, the filtrate was dispersed in ion exchanged water with 500 g/liter in terms of a solid content, and after heating at 60° C. under stirring and adjusting to pH 7, filtered by a suction filtration apparatus and further washed with an equal amount of ion exchanged water, and dried in a hot air dryer at a setting temperature of 120° C. to obtain a zirconium nitride crude powder.

Next, 20 g of the above-mentioned zirconium nitride crude powder was dispersed in 5 liters of isopropanol, and low-temperature wet media pulverization (media: alumina) was carried out for 60 minutes to obtain a zirconium nitride precursor powder. The temperature of isopropanol (dispersing medium) at this time was 5° C. or lower. Further, the above-mentioned zirconium nitride precursor powder was dried and maintained in an $N_2$ gas atmosphere at a temperature of 350° C. for 4 hours to fire the same to obtain a zirconium nitride powder. This zirconium nitride powder was designated as Example 1.

Examples 2 to 12 and Comparative Examples 1 to 10

Zirconium nitride powders of Examples 2 to 12 and Comparative Examples 1 to 10 were prepared by each generating a zirconium nitride crude powder, each pulverizing, and further each firing according to the method shown in Table 1. Incidentally, a zirconium nitride powder was fabricated in the same manner as in Example 1 except for the generating method, pulverization method and firing method shown in Table 1. Incidentally, in the column of the generating method of the zirconium nitride crude powder in Table 1, "TM" is the thermite process, and "PZ" is the plasma method. Also, in the column of the pulverization method of the zirconium nitride crude powder in Table 1, "BM" is the beads mill method, and "JM" is the jet mill method. Further, in the column of the firing time/gas of the zirconium nitride precursor powder in Table 1, "$N_2$" is the nitrogen gas, "He" is the helium gas, and "Ar" is the argon gas.

<Comparative Test 1>

With regard to zirconium nitride powders of Examples 1 to 12 and Comparative Examples 1 to 10, the volume resistivity in the state of the pressurized powder body hardened at a pressure of 5 MPa and the particle size distribution $D_{90}$ when ultrasonically dispersed for 5 minutes in the state of being diluted with water were each measured. These results are shown in Table 1.

<Comparative Test 2>

With regard to 40 g of the zirconium nitride powders of Examples 1 to 11 and Comparative Examples 1 to 9, as shown in Table 1, each was dispersed in 200 ml of an acrylic monomer or an epoxy monomer to prepare a monomer dispersion. On the other hand, with regard to 40 g of the zirconium nitride powders of Example 12 and Comparative Example 10, as shown in Table 1, an amine-based dispersant was added thereto and dispersion treatment was carried out in 200 ml of propylene glycol monomethyl ether acetate (PGMEA) solvent to prepare a black pigment dispersed liquid, and then, an acrylic resin was added to these black pigment dispersed liquids with a mass ratio of black pigment:resin=3:7 and mixed to prepare a black composition. Then, 4 g of Irgacure 500 (photopolymerization initiator: manufactured by BASF) was added to the above-mentioned monomer dispersion or the black composition. Next, after the above-mentioned monomer dispersion or black composition was spin-coated on a glass substrate so that the film thickness after firing became the thickness as shown in Table 1, prebaking was carried out to evaporate the solvent to form a photoresist film. Further, after exposing the photoresist film to a predetermined pattern shape through a photomask, the photoresist film was developed by using an alkaline developer to dissolve and remove the unexposed portion thereof, thereafter, post-baking was carried out to form a black film, respectively. With regard to these black films, OD values of ultraviolet rays (center wavelength 370 nm) and visible light (center wavelength 560 nm) were measured using a densitometer of a product name of D200 manufactured by Macbeth Co., Ltd., based on the above-mentioned equation (1), respectively, and the volume resistivity (Ω·cm) of each black film was also measured. These results were shown in Table 1.

TABLE 1

| | Zirconium nitride crude powder | | | Zirconium nitride precursor powder | |
|---|---|---|---|---|---|
| | Forming method | Pulverization method | Pulverization conditions | Calcination temperature (° C.) | Calcination time/gas (hr) |
| Example 1 | TM | BM | 5° C. or lower | 350 | 4/$N_2$ |
| Example 2 | PZ | BM | 5° C. or lower | 350 | 4/$N_2$ |
| Example 3 | TM | JM | 0.5 MPa | 350 | 4/$N_2$ |
| Example 4 | PZ | BM | 5° C. or lower | 350 | 4/$N_2$ |
| Example 5 | TM | BM | 10° C. | 350 | 4/$N_2$ |
| Example 6 | TM | BM | 5° C. | 250 | 4/$N_2$ |
| Example 7 | TM | BM | 5° C. | 350 | 1/$N_2$ |
| Example 8 | TM | BM | 5° C. | 550 | 1/$N_2$ |
| Example 9 | TM | BM | 5° C. | 350 | 4/He |
| Example 10 | TM | BM | 5° C. | 350 | 4/Ar |
| Example 11 | TM | JM | 0.3 MPa | 350 | 4/$N_2$ |
| Example 12 | TM | BM | 5° C. or lower | 350 | 4/$N_2$ |
| Comparative example 1 | TM | None | — | 350 | 4/$N_2$ |
| Comparative example 2 | PZ | None | — | 350 | 4/$N_2$ |
| Comparative example 3 | TM | BM | 5° C. or lower | None | None |
| Comparative example 4 | PZ | BM | 5° C. or lower | None | None |
| Comparative example 5 | TM | BM | 12° C. | 350 | 4/$N_2$ |
| Comparative example 6 | TM | BM | 5° C. | 200 | 4/$N_2$ |
| Comparative example 7 | TM | BM | 5° C. | 350 | 0.5/$N_2$ |
| Comparative example 8 | TM | BM | 5° C. | 600 | 1/$N_2$ |
| Comparative example 9 | TM | JM | 0.2 MPa | 350 | 4/$N_2$ |
| Comparative example 10 | TM | None | — | 350 | 4/$N_2$ |

| | Zirconium nitride powder | | | Black film | | |
|---|---|---|---|---|---|---|
| | Volume resistivity of pressurized powder body ($\Omega \cdot cm$) | Particle size distribution ($\mu m$) | Monomer or dispersing medium | Film thickness $\mu m$ | OD value | Volume resistivity ($\Omega \cdot cm$) |
| Example 1 | $1 \times 10^8$ | 7 | Acryl | 100 | 2.1 | $5 \times 10^{13}$ |
| Example 2 | $1 \times 10^7$ | 5 | Epoxy | 100 | 2.2 | $2 \times 10^{13}$ |
| Example 3 | $2 \times 10^8$ | 6 | Epoxy | 100 | 2.2 | $2 \times 10^{14}$ |
| Example 4 | $1 \times 10^7$ | 5 | Acryl | 100 | 2.3 | $1 \times 10^{13}$ |
| Example 5 | $8 \times 10^7$ | 10 | Acryl | 100 | 2.0 | $3 \times 10^{13}$ |
| Example 6 | $3 \times 10^7$ | 8 | Acryl | 100 | 2.0 | $2 \times 10^{13}$ |
| Example 7 | $1 \times 10^7$ | 7 | Acryl | 100 | 2.0 | $1 \times 10^{13}$ |
| Example 8 | $1 \times 10^8$ | 8 | Acryl | 100 | 2.4 | $1 \times 10^{14}$ |
| Example 9 | $8 \times 10^7$ | 7 | Acryl | 100 | 2.2 | $3 \times 10^{13}$ |
| Example 10 | $8 \times 10^7$ | 9 | Acryl | 100 | 2.2 | $3 \times 10^{13}$ |
| Example 11 | $2 \times 10^7$ | 10 | Epoxy | 100 | 2.4 | $1 \times 10^{13}$ |
| Example 12 | $1 \times 10^8$ | 7 | PGMEA | 2 | 2.1 | $5 \times 10^{13}$ |
| Comparative example 1 | $1 \times 10^5$ | 30 | Acryl | 100 | 1.0 | $1 \times 10^6$ |
| Comparative example 2 | $3 \times 10^4$ | 14 | Epoxy | 100 | 1.2 | $2 \times 10^6$ |
| Comparative example 3 | $1 \times 10^6$ | 9 | Acryl | 100 | 2.1 | $5 \times 10^{11}$ |
| Comparative example 4 | $2 \times 10^4$ | 5 | Epoxy | 100 | 2.0 | $2 \times 10^{10}$ |
| Comparative example 5 | $7 \times 10^6$ | 10 | Acryl | 100 | 2.0 | $4 \times 10^{12}$ |

TABLE 1-continued

| | | | | | | |
|---|---|---|---|---|---|---|
| Comparative example 6 | $1 \times 10^6$ | 8 | Acryl | 100 | 2.0 | $1 \times 10^{12}$ |
| Comparative example 7 | $3 \times 10^6$ | 7 | Acryl | 100 | 2.0 | $2 \times 10^{12}$ |
| Comparative example 8 | $4 \times 10^6$ | 14 | Acryl | 100 | 1.2 | $1 \times 10^9$ |
| Comparative example 9 | $2 \times 10^6$ | 14 | Epoxy | 100 | 1.3 | $1 \times 10^{11}$ |
| Comparative example 10 | $1 \times 10^5$ | 30 | PGMEA | 2 | 1.9 | $6 \times 10^{12}$ |

As clearly seen from Table 1, in the zirconium nitride powders of Comparative Examples 1 and 10, i.e., whereas the zirconium nitride crude powder was prepared by the thermite process, in the zirconium nitride powder in which the zirconium nitride was not pulverized and was fired by retaining the temperature at 350° C. for 4 hours in the nitrogen gas atmosphere, the volume resistivity in the state of the pressurized powder body hardened at a pressure of 5 MPa was each $1 \times 10^5$ Ω·cm, which was smaller than the appropriate range ($1 \times 10^7$ Ω·cm or more), and the particle size distribution $D_{90}$ when ultrasonically dispersed for 5 minutes in the state of being diluted with water was each 30 µm, which was larger than the appropriate range (10 µm or less). Also, the OD value of the black film fabricated by dispersing the zirconium nitride powder of Comparative Example 1 in an acrylic monomer was small as 1.0 than the appropriate range (2.0 or more), and the volume resistivity was $1 \times 10^6$ Ω·cm, which was smaller than the appropriate range ($1 \times 10^{13}$ or more), and the coating film did not become uniform. Further, the OD value of the black film prepared by dispersing the zirconium nitride powder of Comparative Example 10 in propylene glycol monomethyl ether acetate (PGMEA) was 1.9, which was smaller than the appropriate range (2.0 or more), and the volume resistivity was $6 \times 10^{12}$ Ω·cm which was smaller than the appropriate range ($1 \times 10^{13}$ Ω·cm or more).

In the zirconium nitride powder of Comparative Example 3, i.e., in the zirconium nitride powder in which the zirconium nitride precursor powder was not fired whereas the zirconium nitride crude powder was fabricated by the thermite process, and the zirconium nitride crude powder was pulverized (low temperature wet media pulverization) by the beads mill method at the temperature of the dispersing medium of 5° C. or lower, the particle size distribution $D_{90}$ when ultrasonically dispersed for 5 minutes in the state of being diluted with water was 9 µm, which was within the appropriate range (10 µm or less), but the volume resistivity in the state of the pressurized powder body hardened at a pressure of 5 MPa was $1 \times 10^6$ Ω·cm, which was smaller than the appropriate range ($1 \times 10^7$ Ω·cm or more). Also, the OD value of the black film fabricated by dispersing the zirconium nitride powder of Comparative Example 3 in an acrylic monomer was 2.1, which was within the appropriate range (2.0 or more), but the volume resistivity was $5 \times 10^{11}$ Ω·cm, which was smaller than the appropriate range ($1 \times 10^{13}$ Ω·cm or more).

Contrary to these, in the zirconium nitride powders of Examples 1 and 12, i.e., in the zirconium nitride powder in which the zirconium nitride crude powder was fabricated by the thermite process, and this zirconium nitride was pulverized (low temperature wet media pulverization) by the beads mill method at the temperature of the dispersing medium of 5° C. or lower, and then, fired by retaining the temperature at 350° C. for 4 hours in the nitrogen gas atmosphere, the volume resistivities in the state of the pressurized powder body hardened at a pressure of 5 MPa were each $1 \times 10^8$ Ω·cm, which was within the appropriate range ($1 \times 10^7$ Ω·cm or more), and the particle size distributions $D_{90}$ when ultrasonically dispersed for 5 minutes in the state of being diluted with water were each 7 µm, which was within the appropriate range (10 µm or less). Also, the OD value of the black film fabricated by dispersing the zirconium nitride powder of Example 1 in an acrylic monomer was 2.1, which was within the appropriate range (2.0 or more), and the volume resistivity was $5 \times 10^{13}$ Ω·cm, which was within the appropriate range ($1 \times 10^{13}$ or more). Further, the OD value of the black film fabricated by dispersing the zirconium nitride powder of Example 12 in propylene glycol monomethyl ether acetate (PGMEA) was 2.1, which was within the appropriate range (2.0 or more), and the volume resistivity was $5 \times 10^{13}$ Ω·cm, which was within the appropriate range ($1 \times 10^{13}$ Ω·cm or more).

In the zirconium nitride powder of Example 9, i.e., in the zirconium nitride powder in which the zirconium nitride crude powder was fabricated by the thermite process, and this zirconium nitride was pulverized (low temperature wet media pulverization) by the beads mill method at the temperature of the dispersing medium of 5° C., and then, fired by retaining the temperature at 350° C. for 4 hours in the helium gas atmosphere, the volume resistivity in the state of the pressurized powder body hardened at a pressure of 5 MPa was $8 \times 10^7$ Ω·cm, which was within the appropriate range ($1 \times 10^7$ Ω·cm or more), and the particle size distribution $D_{90}$ when ultrasonically dispersed for 5 minutes in the state of being diluted with water was 7 µm, which was within the appropriate range (10 µm or less). Also, the OD value of the black film fabricated by dispersing the zirconium nitride powder of Example 9 in an acrylic monomer was 2.2, which was within the appropriate range (2.0 or more), and the volume resistivity was $3 \times 10^{13}$ Ω·cm, which was within the appropriate range ($1 \times 10^{13}$ Ω·cm or more).

In the zirconium nitride powder of Example 10, i.e., in the zirconium nitride powder in which the zirconium nitride crude powder was fabricated by the thermite process, and this zirconium nitride was pulverized (low temperature wet media pulverization) by the beads mill method at the temperature of the dispersing medium of 5° C., and then, fired by retaining the temperature at 350° C. for 4 hours in the argon gas atmosphere, the volume resistivity in the state of the pressurized powder body hardened at a pressure of 5 MPa was $8 \times 10^7$ Ω·cm, which was within the appropriate range ($1 \times 10^7$ Ω·cm or more), and the particle size distribution $D_{90}$ when ultrasonically dispersed for 5 minutes in the state of being diluted with water was 9 µm, which was within the appropriate range (10 µm or less). Also, the OD value of the black film fabricated by dispersing the zirconium nitride powder of Example 10 in an acrylic monomer was 2.2, which was within the appropriate range (2.0 or more), and the volume resistivity was $3\times10^{13}$ Ω·cm, which was within the appropriate range ($1\times10^{13}$ Ω·cm or more).

On the other hand, in the zirconium nitride powder of Comparative Example 2, i.e., in the zirconium nitride powder in which the zirconium nitride crude powder was fabricated by the plasma method, but the zirconium nitride was not pulverized and fired by retaining the temperature at 350° C. for 4 hours in the nitrogen gas atmosphere, the volume resistivity in the state of the pressurized powder body hardened at a pressure of 5 MPa was $3\times10^4$ Ω·cm, which was smaller than the appropriate range ($1\times10^7$ Ω·cm or more), and the particle size distribution $D_{90}$ when ultrasonically dispersed for 5 minutes in the state of being diluted with water was 14 μm, which was larger than the appropriate range (10 μm or less). Also, the OD value of the black film fabricated by dispersing the zirconium nitride powder of Comparative Example 2 in an epoxy monomer was 1.2, which was smaller than the appropriate range (2.0 or more), and the volume resistivity was $2\times10^6$ Ω·cm, which was smaller than the appropriate range ($1\times10^{13}$ Ω·cm or more).

In the zirconium nitride powder of Comparative Example 4, i.e., in the zirconium nitride powder in which the zirconium nitride crude powder was fabricated by the plasma method, this zirconium nitride crude powder was pulverized (low temperature wet media pulverization) by the beads mill method at the temperature of the dispersing medium of 5° C. or lower, but the zirconium nitride precursor powder was not fired, the particle size distribution $D_{90}$ when ultrasonically dispersed for 5 minutes in the state of being diluted with water was 5 μm, which was within the appropriate range (10 μm or less), but the volume resistivity in the state of the pressurized powder body hardened at a pressure of 5 MPa was $2\times10^4$ Ω·cm, which was smaller than the appropriate range ($1\times10^7$ Ω·cm or more). Also, the OD value of the black film fabricated by dispersing the zirconium nitride powder of Comparative Example 4 in an epoxy monomer was 2.0, which was within the appropriate range (2.0 or more), but the volume resistivity was $2\times10^{10}$ Ω·cm, which was smaller than the appropriate range ($1\times10^{13}$ Ω·cm or more).

Contrary to these, in the zirconium nitride powders of Examples 2 and 4, i.e., in the zirconium nitride powder in which the zirconium nitride crude powder was fabricated by the plasma method, and this zirconium nitride crude powder was pulverized (low temperature wet media pulverization) by the beads mill method at the temperature of the dispersing medium of 5° C. or lower, and then, fired by retaining the temperature at 350° C. for 4 hours in the nitrogen gas atmosphere, the volume resistivities in the state of the pressurized powder body hardened at a pressure of 5 MPa were each $1\times10^7$ Ω·cm, which was within the appropriate range ($1\times10^7$ Ω·cm or more), and the particle size distributions $D_{90}$ when ultrasonically dispersed for 5 minutes in the state of being diluted with water were each 5 μm, which was within the appropriate range (10 μm or less). Also, the OD value of the black film prepared by dispersing the zirconium nitride powder of Example 2 in an epoxy monomer was 2.2, which was within the appropriate range (2.0 or more), and the volume resistivity was $2\times10^{13}$ Ω·cm, which was within the appropriate range ($1\times10^{13}$ or more). Further, the OD value of the black film fabricated by dispersing the zirconium nitride powder of Example 4 in an acrylic monomer was 2.3, which was within the appropriate range (2.0 or more), and the volume resistivity was $1\times10^{13}$ Ω·cm, which was within the appropriate range ($1\times10^{13}$ Ω·cm or more).

On the other hand, in the zirconium nitride powder of Comparative Example 5, i.e., in the zirconium nitride powder in which the zirconium nitride crude powder was fabricated by the thermite process, but the zirconium nitride crude powder was pulverized (low temperature wet media pulverization) by the beads mill method at the temperature of the dispersing medium of 12° C. which was higher than the appropriate dispersing medium temperature range (10° C. or lower), and then, fired by retaining the temperature at 350° C. for 4 hours in the nitrogen gas atmosphere, the particle size distribution $D_{90}$ when ultrasonically dispersed for 5 minutes in the state of being diluted with water was 10 μm, which was within the appropriate range (10 μm or less), but the volume resistivity in the state of the pressurized powder body hardened at a pressure of 5 MPa was $7\times10^6$ Ω·cm, which was smaller than the appropriate range ($1\times10^7$ Ω·cm or more). Also, the OD value of the black film fabricated by dispersing the zirconium nitride powder of Comparative Example 5 in an acrylic monomer was 2.0, which was within the appropriate range (2.0 or more), but the volume resistivity was $4\times10^{12}$ Ω·cm, which was smaller than the appropriate range ($1\times10^{13}$ Ω·cm or more).

To the contrary, in the zirconium nitride powder of Example 5, i.e., in the zirconium nitride powder in which the zirconium nitride crude powder was fabricated by the thermite process, and the zirconium nitride crude powder was pulverized (low temperature wet media pulverization) by the beads mill method at the temperature of the dispersing medium of 10° C. which was within the appropriate dispersing medium temperature range (10° C. or lower), and then, fired by retaining the temperature at 350° C. for 4 hours in the nitrogen gas atmosphere, the volume resistivity in the state of the pressurized powder body hardened at a pressure of 5 MPa was $8\times10^7$ Ω·cm, which was within the appropriate range ($1\times10^7$ Ω·cm or more), and the particle size distribution $D_{90}$ when ultrasonically dispersed for 5 minutes in the state of being diluted with water was 10 μm, which was within the appropriate range (10 μm or less). Also, the OD value of the black film fabricated by dispersing the zirconium nitride powder of Example 5 in an acrylic monomer was 2.0, which was within the appropriate range (2.0 or more), and the volume resistivity was $3\times10^{13}$ Ω·cm, which was within the appropriate range ($1\times10^{13}$ Ω·cm or more).

On the other hand, in the zirconium nitride powder of Comparative Example 6, i.e., in the zirconium nitride powder in which the zirconium nitride crude powder was fabricated by the thermite process, and this zirconium nitride crude powder was pulverized (low temperature wet media pulverization) by the beads mill method at the temperature of the dispersing medium of 5° C., but fired by retaining at the firing temperature of 200° C. which was lower than the appropriate range (250° C. to 550° C.) for the firing time of 4 hours which was within the appropriate range (1 hour to 5 hours) in the nitrogen gas atmosphere, the particle size distribution $D_{90}$ when ultrasonically dispersed for 5 minutes in the state of being diluted with water was 8 μm, which was within the appropriate range (10 μm or less), but the volume resistivity in the state of the pressurized powder body hardened at a pressure of 5 MPa was $1\times10^6$ Ω·cm, which was smaller than the appropriate range ($1\times10^7$ Ω·cm or more). Also, the OD value of the black film fabricated by dispersing the zirconium nitride powder of Comparative Example 6 in an acrylic monomer was 2.0, which was within the appropriate range (2.0 or more), but the volume resistivity was $1\times10^{12}$ Ω·cm, which was smaller than the appropriate range ($1\times10^{13}$ Ω·cm or more).

In the zirconium nitride powder of Comparative Example 7, i.e., in the zirconium nitride powder in which the zirconium nitride crude powder was fabricated by the thermite process, and this zirconium nitride crude powder was pulverized (low temperature wet media pulverization) by the beads mill method at the temperature of the dispersing medium of 5° C., but fired by retaining at the firing temperature of 350° C. which was within the appropriate range (250° C. to 550° C.) and the firing time of 0.5 hour which was shorter than the appropriate range (1 hour to 5 hours) in the nitrogen gas atmosphere, the particle size distribution $D_{90}$ when ultrasonically dispersed for 5 minutes in the state of being diluted with water was 7 μm, which was within the appropriate range (10 μm or less), but the volume resistivity in the state of the pressurized powder body hardened at a pressure of 5 MPa was $3\times10^6$ Ω·cm, which was smaller than the appropriate range ($1\times10^7$ Ω·cm or more). Also, the OD value of the black film fabricated by dispersing the zirconium nitride powder of Comparative Example 7 in an acrylic monomer was 2.0, which was within the appropriate range (2.0 or more), but the volume resistivity was $2\times10^{12}$ Ω·cm, which was smaller than the appropriate range ($1\times10^{13}$ Ω·cm or more).

In the zirconium nitride powder of Comparative Example 8, i.e., in the zirconium nitride powder in which the zirconium nitride crude powder was fabricated by the thermite process, and this zirconium nitride crude powder was pulverized (low temperature wet media pulverization) by the beads mill method at the temperature of the dispersing medium of 5° C., but fired by retaining at the firing temperature of 600° C. which was a temperature higher than the appropriate range (250° C. to 550° C.) for the firing time of 1 hour which was within the appropriate range (1 hour to 5 hours) in the nitrogen gas atmosphere, the volume resistivity in the state of the pressurized powder body hardened at a pressure of 5 MPa was $4\times10^6$ Ω·cm, which was smaller than the appropriate range ($1\times10^7$ Ω·cm or more), and the particle size distribution $D_{90}$ when ultrasonically dispersed for 5 minutes in the state of being diluted with water was 14 μm, which was larger than the appropriate range (10 μm or less). Also, the OD value of the black film fabricated by dispersing the zirconium nitride powder of Comparative Example 8 in an acrylic monomer was 1.2, which was smaller than the appropriate range (2.0 or more), and the volume resistivity was $1\times10^9$ Ω·cm, which was smaller than the appropriate range ($1\times10^{13}$ Ω·cm or more).

Contrary to these, i.e., in the zirconium nitride powder of Example 6, i.e., in the zirconium nitride powder in which the zirconium nitride crude powder was fabricated by the thermite process, and this zirconium nitride crude powder was pulverized (low temperature wet media pulverization) by the beads mill method at the temperature of the dispersing medium of 5° C., and then, fired by retaining the temperature at 250° C. which was the firing temperature within the appropriate range (250° C. to 550° C.) for 4 hours which was the firing time within the appropriate range (1 hour to 5 hours) in the nitrogen gas atmosphere, the volume resistivity in the state of the pressurized powder body hardened at a pressure of 5 MPa was $3\times10^7$ Ω·cm, which was within the appropriate range ($1\times10^7$ Ω·cm or more), and the particle size distribution $D_{90}$ when ultrasonically dispersed for 5 minutes in the state of being diluted with water was 8 lam, which was within the appropriate range (10 μm or less). Also, the OD value of the black film fabricated by dispersing the zirconium nitride powder of Example 6 in an acrylic monomer was 2.0, which was within the appropriate range (2.0 or more), and the volume resistivity was $2\times10^{13}$ Ω·cm, which was within the appropriate range ($1\times10^{13}$ Ω·cm or more).

In the zirconium nitride powder of Example 7, i.e., in the zirconium nitride powder in which the zirconium nitride crude powder was fabricated by the thermite process, and this zirconium nitride crude powder was pulverized (low temperature wet media pulverization) by the beads mill method at the temperature of the dispersing medium of 5° C., and then, fired by retaining the temperature at 350° C. which was the firing temperature within the appropriate range (250° C. to 550° C.) for 1 hour which was the firing time within the appropriate range (1 hour to 5 hours) in the nitrogen gas atmosphere, the volume resistivity in the state of the pressurized powder body hardened at a pressure of 5 MPa was $1\times10^7$ Ω·cm, which was within the appropriate range ($1\times10^7$ Ω·cm or more), and the particle size distribution $D_{90}$ when ultrasonically dispersed for 5 minutes in the state of being diluted with water was 7 lam, which was within the appropriate range (10 μm or less). Also, the OD value of the black film fabricated by dispersing the zirconium nitride powder of Example 7 in an acrylic monomer was 2.0, which was within the appropriate range (2.0 or more), and the volume resistivity was $1\times10^{13}$ Ω·cm, which was within the appropriate range ($1\times10^{13}$ Ω·cm or more).

In the zirconium nitride powder of Example 8, i.e., in the zirconium nitride powder in which the zirconium nitride crude powder was fabricated by the thermite process, and this zirconium nitride crude powder was pulverized (low temperature wet media pulverization) by the beads mill method at the temperature of the dispersing medium of 5° C., and then, fired by retaining the temperature at 550° C. which was the firing temperature within the appropriate range (250° C. to 550° C.) for 1 hour which was the firing time within the appropriate range (1 hour to 5 hours) in the nitrogen gas atmosphere, the volume resistivity in the state of the pressurized powder body hardened at a pressure of 5 MPa was $1\times10^8$ Ω·cm, which was within the appropriate range ($1\times10^7$ Ω·cm or more), and the particle size distribution $D_{90}$ when ultrasonically dispersed for 5 minutes in the state of being diluted with water was 8 lam, which was within the appropriate range (10 μm or less). Also, the OD value of the black film fabricated by dispersing the zirconium nitride powder of Example 8 in an acrylic monomer was 2.4, which was within the appropriate range (2.0 or more), and the volume resistivity was $1\times10^{14}$ Ω·cm, which was within the appropriate range ($1\times10^{13}$ Ω·cm or more).

On the other hand, in the zirconium nitride powder of Comparative Example 9, i.e., in the zirconium nitride powder in which the zirconium nitride crude powder was fabricated by the thermite process, but the zirconium nitride crude powder was pulverized by jet mill pulverization with the pulverization pressure of 0.2 MPa which was smaller than the appropriate range (0.3 MPa or more), and then, fired by retaining the temperature at 350° C. for 4 hours in the nitrogen gas atmosphere, the volume resistivity in the state of the pressurized powder body hardened at a pressure of 5 MPa was $2\times10^6$ Ω·cm, which was smaller than the appropriate range ($1\times10^7$ Ω·cm or more), and the particle size distribution $D_{90}$ when ultrasonically dispersed for 5 minutes in the state of being diluted with water was 14 μm, which was larger than the appropriate range (10 μm or less). Also, the OD value of the black film fabricated by dispersing the zirconium nitride powder of Comparative Example 9 in an epoxy monomer was 1.3, which was smaller than the appropriate range (2.0 or more), and the volume resistivity was $1\times10^{11}$ Ω·cm, which was smaller than the appropriate range ($1\times10^{13}$ Ω·cm or more).

To the contrary, in the zirconium nitride powder of Example 3, i.e., in the zirconium nitride powder in which the zirconium nitride crude powder was fabricated by the thermite process, and the zirconium nitride crude powder was pulverized by jet mill pulverization with the pulverization pressure of 0.5 MPa, which was within the appropriate range (0.3 MPa or more), and then, fired by retaining the temperature at 350° C. for 4 hours in the nitrogen gas atmosphere, the volume resistivity in the state of the pressurized powder body hardened at a pressure of 5 MPa was $2 \times 10^8$ Ω·cm, which was within the appropriate range ($1 \times 10^7$ Ω·cm or more), and the particle size distribution $D_{90}$ when ultrasonically dispersed for 5 minutes in the state of being diluted with water was 6 lam, which was within the appropriate range (10 μm or less). Also, the OD value of the black film fabricated by dispersing the zirconium nitride powder of Example 3 in an epoxy monomer was 2.2, which was within the appropriate range (2.0 or more), and the volume resistivity was $2 \times 10^{14}$ Ω·cm, which was within the appropriate range ($1 \times 10^{13}$ Ω·cm or more).

In the zirconium nitride powder of Example 11, i.e., in the zirconium nitride powder of Example 11 in which the zirconium nitride crude powder was fabricated by the thermite process, and the zirconium nitride crude powder was pulverized by jet mill pulverization with the pulverization pressure of 0.3 MPa, which was within the appropriate range (0.3 MPa or more), and then, fired by retaining the temperature at 350° C. for 4 hours in the nitrogen gas atmosphere, the volume resistivity in the state of the pressurized powder body hardened at a pressure of 5 MPa was $2 \times 10^7$ Ω·cm, which was within the appropriate range ($1 \times 10^7$ Ω·cm or more), and the particle size distribution $D_{90}$ when ultrasonically dispersed for 5 minutes in the state of being diluted with water was 10 lam, which was within the appropriate range (10 μm or less). Also, the OD value of the black film fabricated by dispersing the zirconium nitride powder of Example 11 in an epoxy monomer was 2.4, which was within the appropriate range (2.0 or more), and the volume resistivity was $1 \times 10^{13}$ Ω·cm, which was within the appropriate range ($1 \times 10^{13}$ Ω·cm or more).

UTILIZABILITY IN INDUSTRY

The zirconium nitride powder of the present invention can be used as a black pigment for obtaining a black film having high blackness and high insulating property.

The invention claimed is:

1. A zirconium nitride powder having a volume resistivity of $10^7$ Ω·cm or more in a state of a pressurized powder body hardened at a pressure of 5 MPa, and a particle size distribution $D_{90}$ of 10 μm or less when ultrasonically dispersed for 5 minutes in a state of being diluted with water or an alcohol having a carbon number is in a range of 2 to 5, wherein:
    the zirconium nitride powder is in a state of secondary particles in which primary particles are aggregated, and
    the particle size distribution is a volume-based particle size distribution measured by a laser diffraction scattering method.

2. A method for producing the zirconium nitride powder according to claim 1, the method comprising:
    generating a zirconium nitride crude powder by a thermite process or a plasma synthetic method,
    fabricating a zirconium nitride precursor powder having a particle size distribution $D_{90}$ of 10 μm or less when ultrasonically dispersed for 5 minutes in a state of being diluted with water or an alcohol having a carbon number in a range of 2 to 5 by subjecting the zirconium nitride crude powder to low temperature wet media pulverization at a temperature of a dispersing medium of 10° C. or lower or subjecting to jet mill pulverization at a gas pressure of 0.3 MPa or higher; and
    producing a zirconium nitride powder having a volume resistivity of $10^7$ Ω·cm or more in a state of the pressurized powder body hardened at a pressure of 5 MPa by firing the pulverized zirconium nitride precursor powder in an inert gas atmosphere,
    wherein:
    the zirconium nitride powder is in a state of secondary particles in which primary particles are aggregated, and
    the particle size distribution is a volume-based particle size distribution measured by a laser diffraction scattering method.

3. A monomer dispersion wherein the zirconium nitride powder according to claim 1 is dispersed in an acrylic monomer or an epoxy monomer.

4. The monomer dispersion according to claim 3, further comprising a metal oxide powder.

5. The monomer dispersion according to claim 3, further comprising a plasticizer.

6. The monomer dispersion according to claim 3, further comprising a polymer dispersant.

7. A method for producing a black film, the method comprising:
    forming a coating film by coating the monomer dispersion according to claim 3 onto a substrate; and
    fabricating a black film by subjecting the coated film to heat curing or ultraviolet curing.

8. A black composition wherein the zirconium nitride powder according to claim 1 is dispersed as a black pigment in a dispersing medium and a resin is further mixed.

9. A method for fabricating a black film, the method comprising:
    forming a coating film by coating the black composition according to claim 8 onto a substrate; and
    fabricating a black film by subjecting the coated film to heat curing or ultraviolet curing.

10. The black composition according to claim 8, wherein the dispersing medium is propylene glycol monomethyl ether acetate (PGMEA), methyl ethyl ketone (MEK) or butyl acetate (BA).

11. The black composition according to claim 8, wherein the resin is an acrylic resin or an epoxy resin.

12. The black composition according to claim 8, further comprising a polymer dispersant.

* * * * *